United States Patent [19]
Andrew et al.

[11] Patent Number: 5,988,457
[45] Date of Patent: Nov. 23, 1999

[54] BEVERAGE VESSEL

[75] Inventors: Michael A. Andrew, Milford, Conn.;
Walter G. Birdsell, Marlborough, Mass.

[73] Assignee: HP Intellectual Corp., Wilmington, Del.

[21] Appl. No.: 09/058,246

[22] Filed: Apr. 10, 1998

[51] Int. Cl.⁶ .................................................. A47G 19/14
[52] U.S. Cl. ...................... 222/475.1; 222/507; 222/518
[58] Field of Search ............................ 222/465.1, 475.1, 222/507, 518

[56] References Cited

U.S. PATENT DOCUMENTS

| | | | |
|---|---|---|---|
| 1,371,001 | 3/1921 | Schmidt . | |
| 4,090,648 | 5/1978 | Roberts | 222/570 |
| 4,676,411 | 6/1987 | Simasaka | 222/517 |
| 4,924,922 | 5/1990 | Johnson | 141/346 |
| 4,930,687 | 6/1990 | Brindopke | 222/475.1 |
| 5,110,016 | 5/1992 | Heiman | 222/475.1 |
| 5,224,634 | 7/1993 | Graham | 222/475.1 |
| 5,265,767 | 11/1993 | Gustafson | 222/475.1 |
| 5,379,925 | 1/1995 | Monthrath et al. | 222/475.1 |
| 5,497,917 | 3/1996 | Krimmel et al. | 222/475.1 |
| 5,615,808 | 4/1997 | Huang | 222/518 |
| 5,653,362 | 8/1997 | Patel | 222/475.1 |
| 5,699,841 | 12/1997 | Takagawa | 222/518 |

*Primary Examiner*—Joseph A. Kaufman
*Attorney, Agent, or Firm*—Barry E. Deutsch

[57] ABSTRACT

A beverage vessel or carafe 20 includes a container 22, an upper body 24 which is secured to the container, a handle 28 which extends between the upper body 24 and the container 22, a spout 30 formed in the upper body and a lid 34 which located in an opening 32 of the upper body. A seal 52 or 52a is located between, and compressed by, the container 22 and the upper body 24 to preclude the beverage from undesirably entering a chamber 70 of the carafe 20. A rib 98 of the upper body 24 cooperates with a pocket 110 of the container 22 to secure the upper body with the container. A fastening element 142 is attached within a pocket 140 formed on an outer surface of the container 22 and includes a sleeve 148 which fits snugly within a hole 156 of an end 38 of the handle 28 and is secured in this firm assembly by a threaded fastener 164. A compliant handle cover 180 is assembled with the handle 28 to provide a firm but tactile comfort for one who uses the carafe 20.

12 Claims, 7 Drawing Sheets

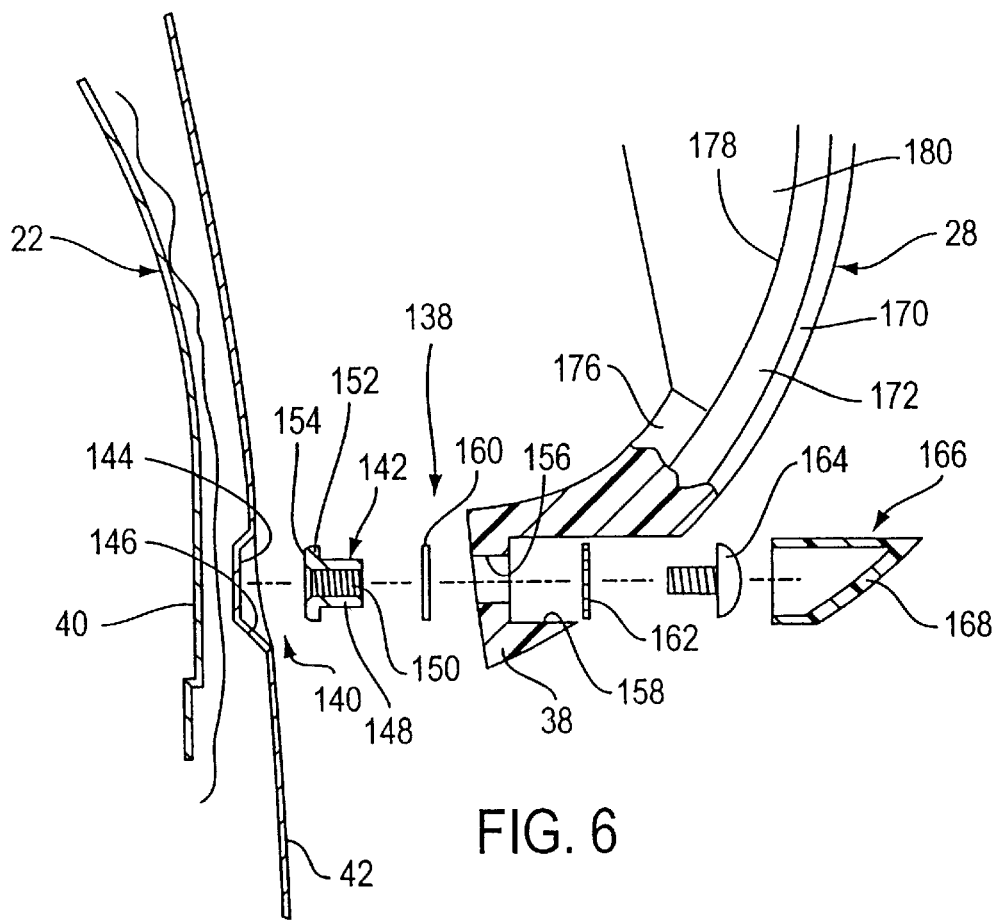
FIG. 6
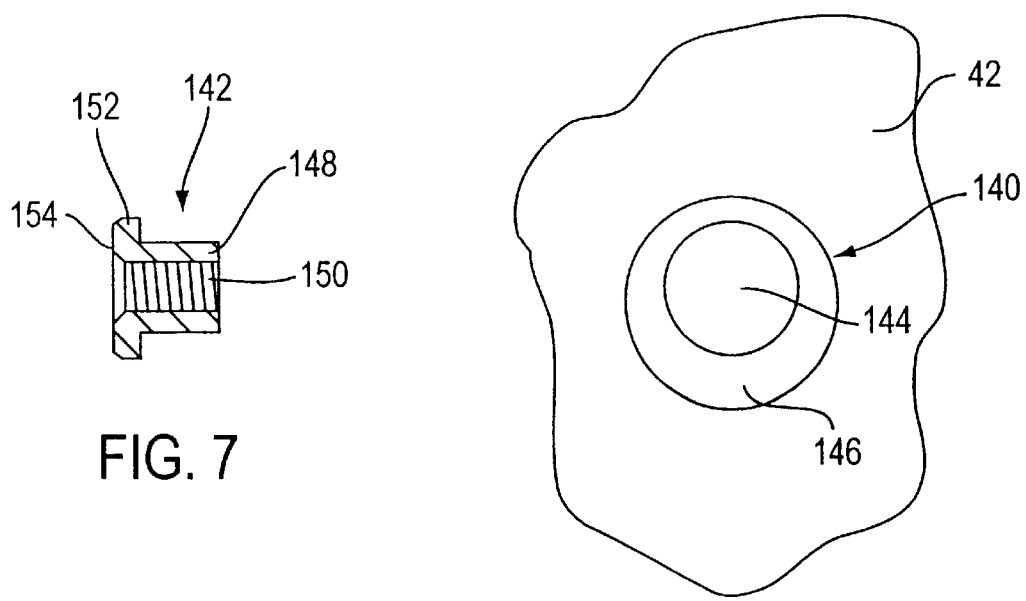
FIG. 7
FIG. 8

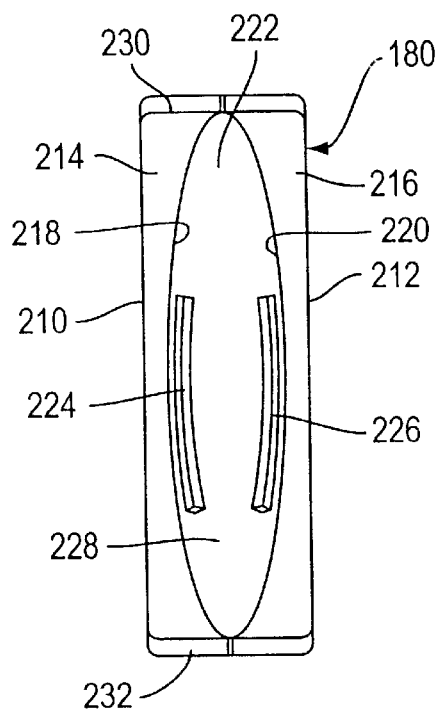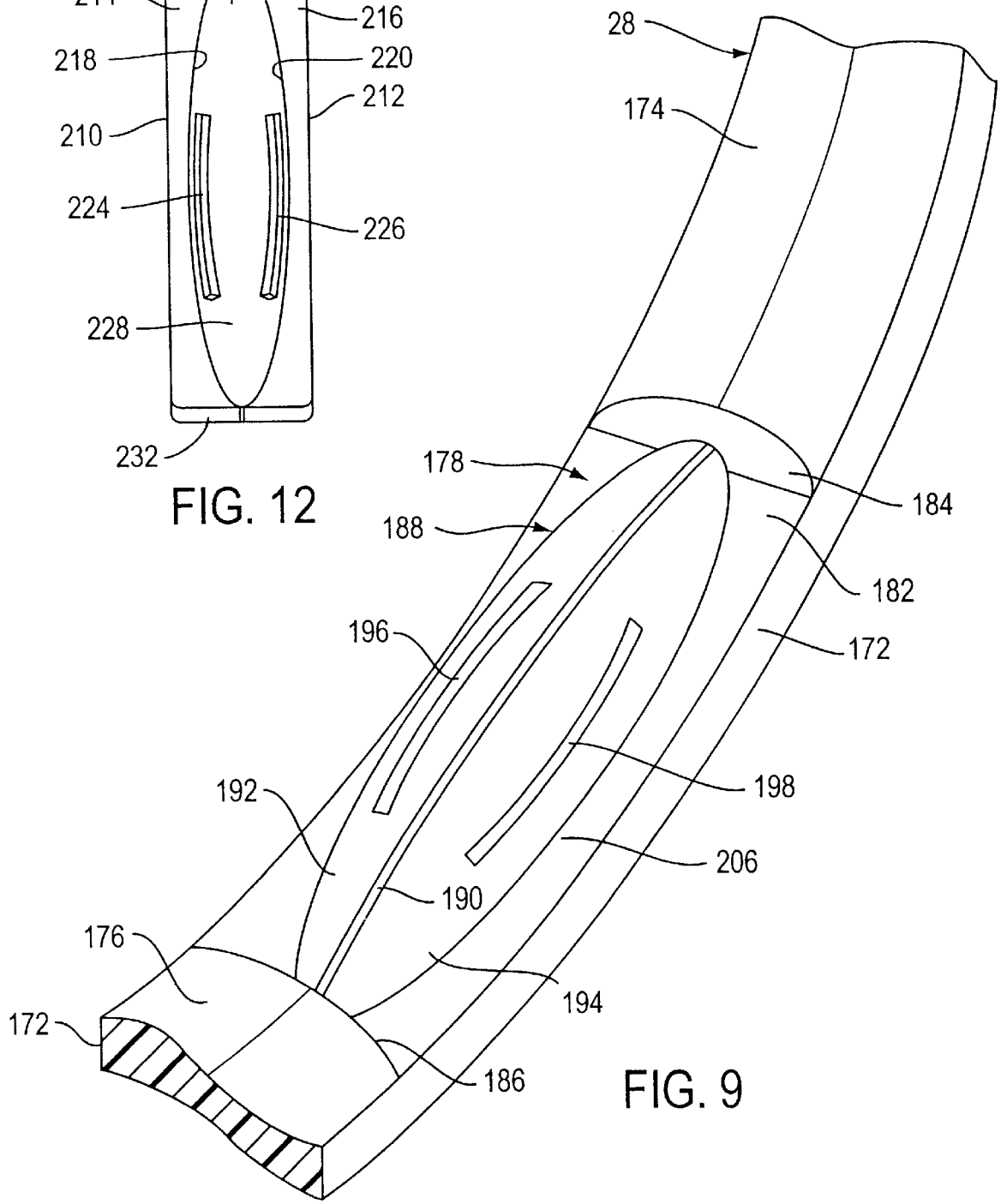

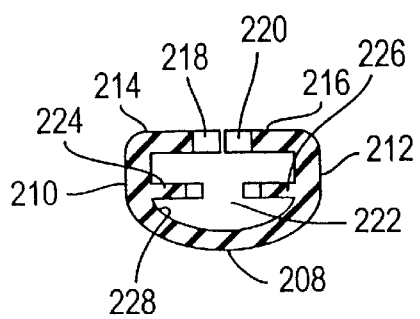
FIG. 13
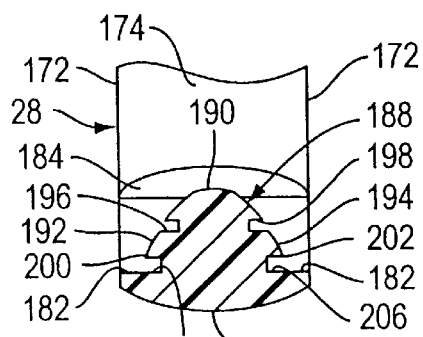
FIG. 11
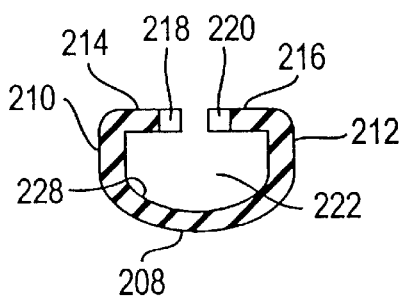
FIG. 14
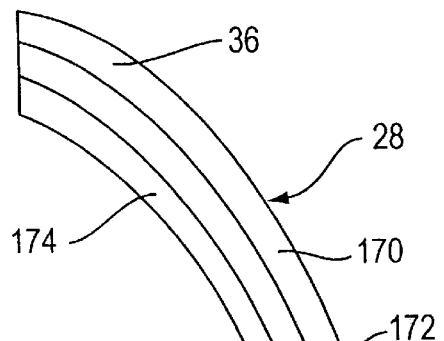
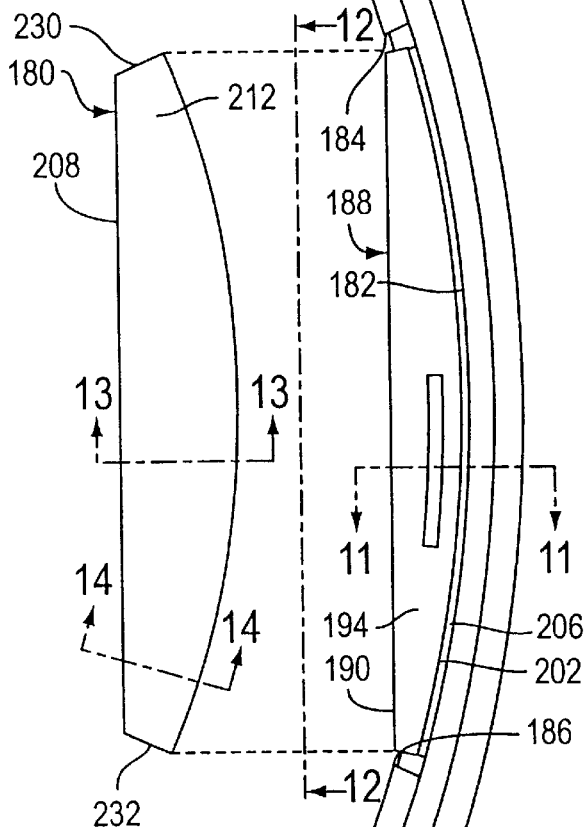
FIG. 10

BEVERAGE VESSEL

BACKGROUND OF THE INVENTION

This invention relates to a beverage vessel, and particularly relates to a beverage vessel for containing liquid beverages and for facilitating the dispensing of the beverages therefrom.

A beverage vessel is a container which is frequently referred to as a carafe and is used to temporarily store a hot or cold liquid beverage therein. At least the container of the carafe can be composed of materials such as, for example, glass or metal. The carafe can be used to transport the contained beverage from one location to another such as, for example, from a kitchen to a serving area. In addition to functioning as a container, the carafe typically includes structure, such as a spout and a handle, for facilitating the selective dispensing of the beverage therefrom.

In the storing and dispensing of hot beverages, such as coffee or tea, the carafe may be structured to maintain the beverage in the heated state for eventual pleasant consumption. This is frequently accomplished by structuring the container of the carafe with two spaced walls.

When handling a carafe for transporting and dispensing the hot or cold beverage contained therein, it is important that the handle of the carafe be firmly secured with the container to facilitate proper and comfortable handling of the beverage-containing carafe. Further, in areas other than the normal flow paths of the beverage being dispensed, it is important that appropriate seals are provided and firmly secured to avoid unexpected, and potentially harmful, leakage.

SUMMARY OF THE INVENTION

Therefore, it is an object of this invention to provide a beverage vessel having a handle which is firmly secured with other components of the vessel for proper handling of the vessel when transporting and dispensing a beverage contained in the vessel.

Another object of this invention is to provide a beverage vessel having a handle which provides tactile comfort to the user when transporting and dispensing a beverage contained in the vessel.

A further object of this invention is to provide a beverage vessel in which selected areas of the vessel are firmly sealed to preclude undesired flow of the beverage into, and from, areas of the vessel other than the normal beverage-flow paths such as the spout thereof.

With these and other objects in mind, this invention contemplates a beverage vessel which includes a container formed with an opening at one end thereof with the opening formed by an inner wall surface of the container. An outer wall surface is formed on the container adjacent the opening thereof and has a latch receptor formed therein. A unitary body is formed with an inner wall and an outer wall which are integrally joined at upper ends thereof and spaced apart at lower ends thereof to form an opening between the inner and outer walls. A latch member is formed on the outer wall of the body and includes structure for latching engagement with the latch receptor of the container. The unitary body is in assembly with the container with the inner wall surface and the outer wall surface of the container being located within the opening formed by, and between, the inner and outer walls of the unitary body. The inner wall of the unitary body conceals the opening of the container and forms an opening of the beverage vessel.

This invention further contemplates a beverage vessel having a container, with a handle attached at opposite ends thereof to an exterior of the container and formed with an inboard exterior surface which faces the exterior of the container. A portion of the inboard exterior surface of the handle is selectively formed in a prescribed configuration. A compliant cover is formed with an interior structure in a configuration generally complementary to the prescribed configuration and is positioned over the portion of the inboard exterior surface of the handle to provide a compliant handle grip.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 6 is an exploded view showing the handle-to-container attachment facility of FIG. 2 for securing the bottom of the handle to the side of the container in accordance with certain principles of the invention;

FIG. 7 is a sectional view showing an internally threaded member which forms a part of the handle-to-container attachment facility of FIGS. 2 and 6 in accordance with certain principles of the invention;

FIG. 8 is a partial side view of the container of FIGS. 2 and 6 showing the structural site on the container where the threaded member of FIG. 7 is attached in accordance with certain principles of the invention;

FIG. 9 is a perspective view showing a portion of the handle of FIG. 2 in accordance with certain principles of the invention;

FIG. 10 is a side view of the portion of the handle of FIG. 9 and a handle cover in accordance with certain principles of the invention;

FIG. 11 is a sectional view taken along line 11—11 of FIG. 10 showing structure of the handle in accordance with certain principles of the invention;

FIG. 12 is a side view of the handle cover of FIG. 10 taken along line 12—12 and showing assembly structure in accordance with certain principles of the invention;

FIG. 13 is a sectional view taken along line 13—13 of FIG. 10 showing an intermediate portion of the handle cover in accordance with certain principles of the invention; and FIG. 14 is a sectional view taken along line 14—14 of FIG. 10 showing a section of a second portion of the handle cover of FIG. 10 in accordance with certain principles of the invention.

DETAILED DESCRIPTION OF THE PREFERRED EMBODIMENT OF THE INVENTION

Figure 1:
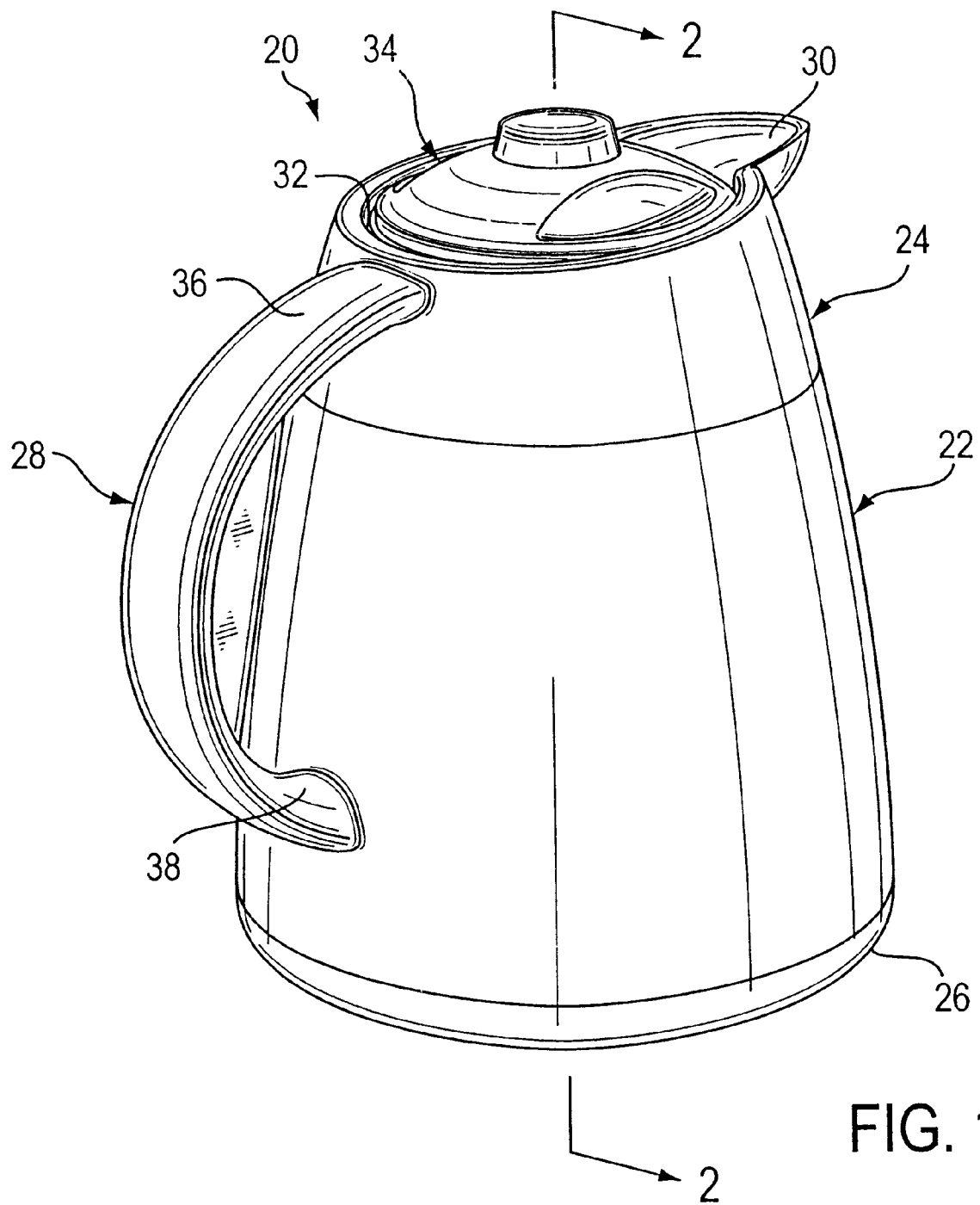
FIG. 1 is a perspective view showing a beverage vessel embodying certain principles of the invention.

Referring to FIG. 1, a beverage vessel or carafe 20 includes a container 22, an upper body 24, a lower cap or base 26 and a handle 28. The upper body 24 is formed with a spout 30 and an opening 32 into which is inserted a lid 34 with facility for selectively sealing the opening 32. The handle 28 is formed with the upper body 24, at a first end 36 of the handle, and extends and is attached to a lower side portion of the container 22, at a second end 38 of the handle.

Figure 2:
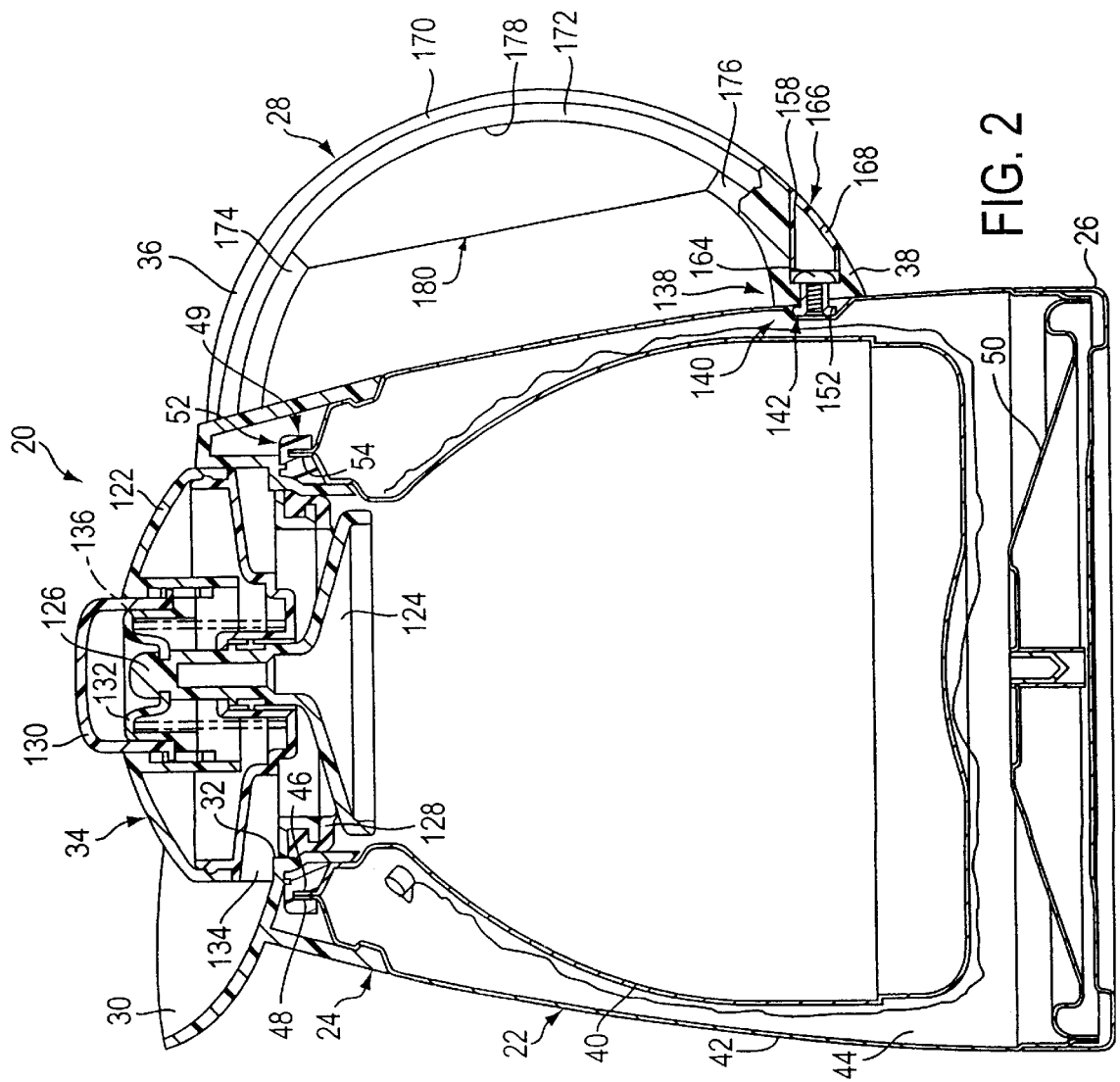
FIG. 2 is a partial sectional view taken along line 2—2 of FIG. 1 showing a container, an upper body, a handle, a sealing facility and a handle-to-container attachment facility, of the beverage vessel of FIG. 1 embodying certain principles of the invention.
Figure 4:
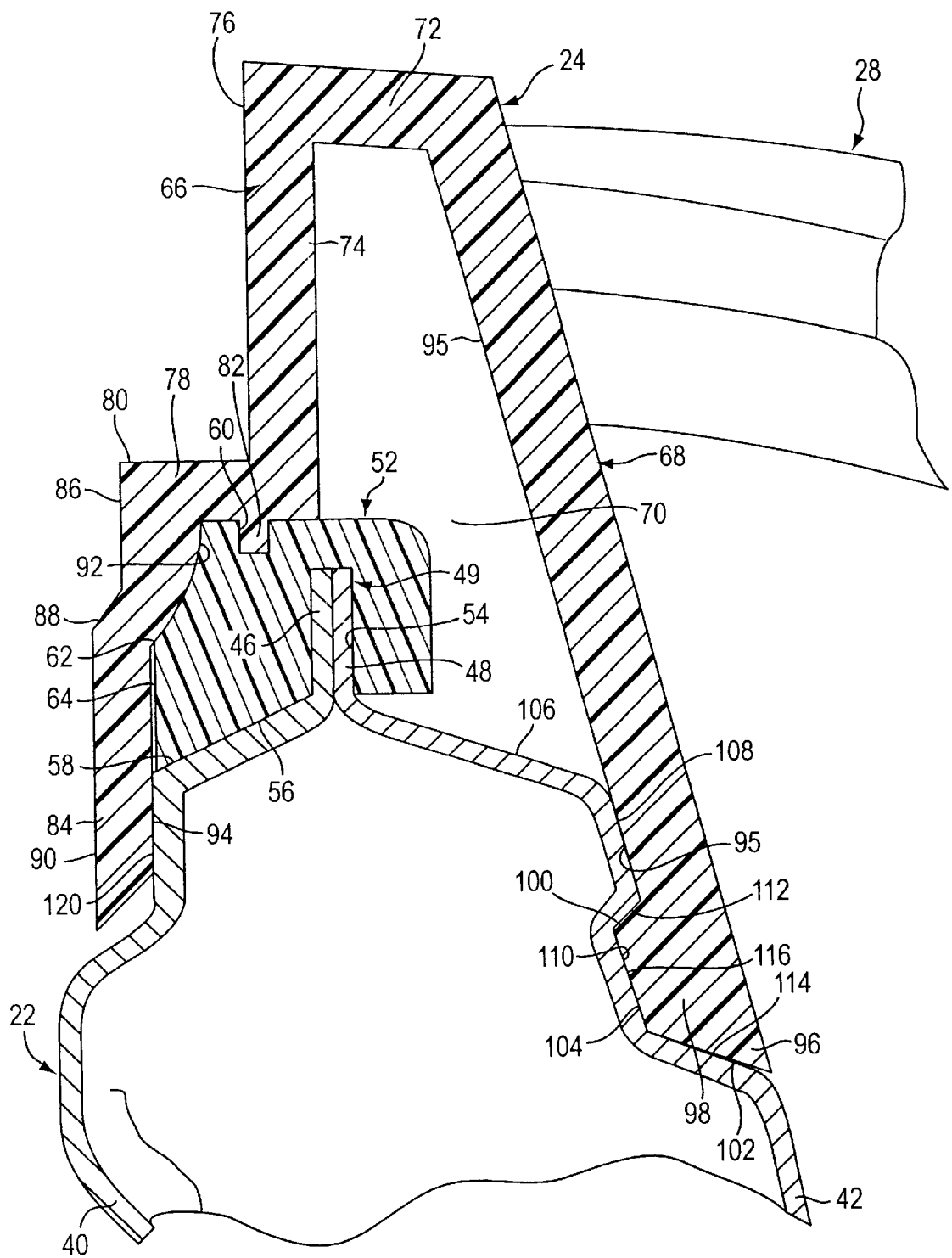
FIG. 4 is an enlarged sectional view showing the sealing facility of FIG. 2, which is a first embodiment thereof, in accordance with certain principles of the invention.

As shown in FIG. 2, the container 22 includes an inner bottle 40 situated spatially within an outer bottle 42 with a space 44 defined therebetween. As also shown in FIG. 4, the bottles 40 and 42 are formed with upper, flat rims 46 and 48, respectively, which are parallel with each other and are in interfacing, sealed engagement to hermetically seal the space 44. The flat rims 46 and 48 join together to form a rim-like, circular tab 49 of the container 22. The bottom of the outer bottle 42 is attached to a frame 50 which is concealed by the base 26. The bottles 40 and 42, and the base 26, are composed of stainless steel.

As further shown in FIGS. 2 and 4, a circular compliant seal 52 is formed with a circular groove 54 on the underside thereof for receipt of the flat tab 49 formed by the sealed rims 46 and 48. A portion of the underside of the seal 52 is formed as a sloping surface 56 which is complementary to, and in engagement with, a sloping surface 58 near the top of the bottle 40. A top surface of the seal 52 is formed with a thin circular groove 60, while an inboard side of the seal is formed with a sloping surface 62 and straight surface 64 which is contiguous with the sloping surface 62. The seal 52 is composed of silicone rubber, but could be composed of other materials commonly used for forming seals without departing from the spirit and scope of the invention.

The upper body 24 is composed of plastic and is molded in the configuration illustrated in FIG. 2. The body 24 is formed integrally with the handle 28 as a single piece of material forming a body/handle unit, but could be two pieces without departing from the spirit and scope of some aspects of the invention. The body 24 is further formed with an inner circular rim member 66 and an outer circular rim member 68 which is concentric with the circular rim 66. The rim members 66 and 68 are spaced apart and form a chamber 70 therebetween which is facing downward as illustrated in FIG. 2. The upper ends of the rim members 66 and 68, as illustrated in FIG. 2, are joined at the top thereof by a linking section 72 of the body 24.

The inner rim member 66 is formed with a straight upper section 74, having a straight outboard surface 76, which joins at the top thereof with the linking section 72 and with one end of a generally horizontal shoulder section 78 at the bottom of the upper section. The shoulder section 78 is formed with a shoulder surface 80. An underside portion of the juncture of the upper section 74 and the shoulder section 78 is formed with a circular rib 82 which extends downward therefrom. An upper end of a lower section 84 of the inner rim member 66 joins another end of the shoulder section 78. The lower section 84 is formed with an upper straight outboard surface 86, an intermediate sloping surface 88 and a lower straight surface 90. The lower section 84 also is formed with an upper inboard arcuate surface 92 and a lower inboard straight surface 94.

The outer rim member 68 joins with the linking section 72 and extends downward therefrom at an angle which slopes away from the inner rim member 66. The outer rim member 68 is formed with a straight inboard surface 95 which extends to a free end 96 thereof and which is formed with a rib 98 which extends generally laterally inward. The rib 98 extends in circular fashion around the inboard side of the free end 96 of the outer rim member 68. An upper portion of the rib 98 is formed with an inward and downward sloping surface 100 which extends for a short distance, and an outward and downward sloping surface 102 at the base thereof which extends for a distance greater than the short distance of the surface 100. An inboard surface 104 of the rib 98 extends between inboard ends of the sloping surfaces 100 and 102, and slopes at an angle generally parallel with the sloping angle of the outer rim member 68.

As noted above, the seal 52 is assembled with the container 22 by positioning the groove 54 of the seal over the tab 49 of the container. The surface 56 of the seal 52 seats on the surface 58 of the container 22.

Figure 3:
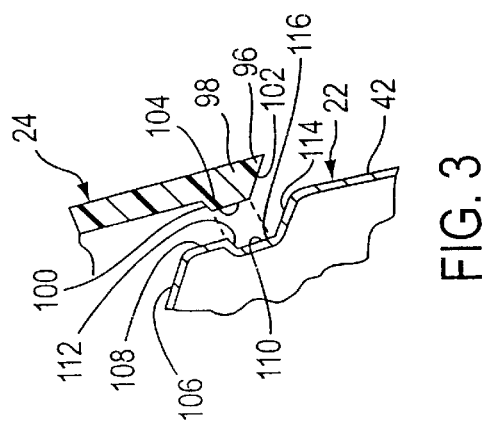
FIG. 3 is an enlarged sectional view showing a portion of a body-to-container attachment facility in accordance with certain principles of the invention.

Referring to FIGS. 3 and 4, when the upper body 24 is assembled on top of the container 22, the body is initially lowered into a position where the sloping surface 102 of the outer rim member 68 is located just above a sloping surface 106 of the outer bottle 42. With the upper body 24 in this position, the lower section 84 of the inner rim member 66 is located above and to the left of the seal 52. With continued movement of the upper body 24 toward the container 22, the surface 102 of the outer rim member 68 engages the surface 106 of the container whereby the outer rim member is biased or cammed laterally outward. Eventually, the surface 104 of the rib 98 moves along a flat sloping surface 108 of the container 22 whereby the outer rim member 68 is being moved away from the inner rim member 66. At the time the outer rim member 68 is being moved toward the container 22, the inboard surface 94 (FIG. 4) of the lower section 84 of the inner rim member 66 is being moved along side of the surface 64 of the seal 52.

The rib 98 eventually reaches a pocket 110 formed in the side of the outer bottle 42 of the container 22. The pocket 110 is formed with surfaces 112, 114 and 116 which are complementary to the respective surfaces 100, 102 and 104 of the rib 98. The rib 98 then glides into the pocket 110 to secure the upper body with the container 22. The angle defined by the mating surfaces 100 and 112 is sloped to such a degree that it is extremely difficult, if not impossible, to withdraw the upper body 24 from assembly with the container 22 by a direct upward movement as viewed in FIG. 4.

As the rib 98 approaches and enters the pocket 110, the lower section 84 of the inner rim member 66 is moved to the position illustrated in FIG. 4. As this is occurring, the surface 94 frictionally slides along a side surface 120 of the inner bottle 40 to further enhance the secured assembly of the upper body 24 with the container 22. Further, the rib 82 of the inner rim member 66 is moved into the groove 60 of the seal 52, and the arcuate surface 92 of the inner rim member is moved in to engagement with the surface 62 of the seal. These points of engagement between the inner rim member 66 and the seal, as well as other points illustrated in FIG. 4, provide a plurality of pressure points which compress the seal 52 firmly into the sealing configuration to effectively seal the chamber 70 to preclude the entry of any beverage therein. It is noted that the frictional engagement between the surface 94 of the inner rim member 66 and the surface 120 of the inner bottle 40 enhance the sealing effect primarily provided by the seal 52. All of these features combine to provide a first embodiment of a sealing assembly.

Figure 5:
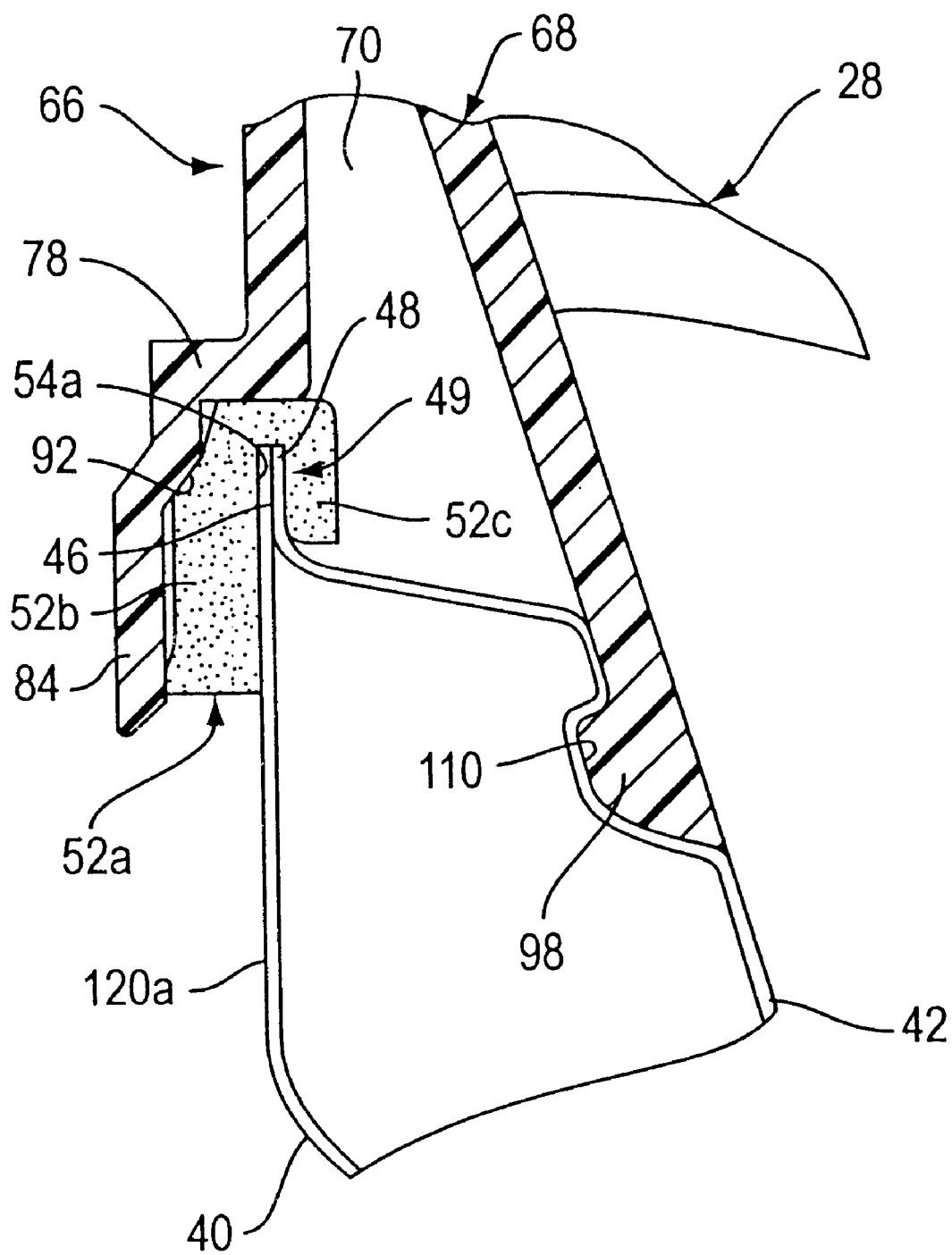
FIG. 5 is a sectional view showing a second embodiment of a sealing facility embodying certain principles of the invention.

A second embodiment of a sealing assembly is shown in FIG. 5 and is the preferred embodiment. In the second embodiment, the inner bottle 40 is formed with a straight side wall 120a which is in the plane of the flat rim 46 of the inner bottle in comparison to the side wall 120 of the first embodiment which is offset to the left as shown in FIG. 4. In addition, a seal 52a is shaped generally in the configuration of an inverted "J" element having a long leg 52b, a short leg 52c and a slot 54a formed therein which is positioned over the rim tab 49 of the container 22. When the upper body 24 is assembled with the container 22 in the manner described above, the lower section 84 of the inner rim member 66 moves along side of the adjacent leg 52b of the seal 52a, the action of which combines with the underside of the shoulder section 78 and the arcuate surface 92 to compress the seal at various pressure points to effectively seal the chamber 70.

As described above, the inner rim member 66 of the upper body 24 in cooperation with portions of the container 22 form a seal compression assembly which firmly compresses the seal 52, or the seal 52a, to attain significantly enhanced sealing of the chamber 70. Also, the seals 52 and 52a provide a cushion between the hard surfaces of the container 22 and the upper body 24 during, and after, assembly of the upper body with the container. Further, the rib 98 of the outer rim member 68 of the upper body 24 in cooperation with the pocket 110 of the container 22 form a latch assembly which enhances the securance of the upper body with the container.

Referring again to FIG. 2, the lid 34 includes a two-piece body 122, a dish-shaped sealing member 124 with a stem 126 extending into a bottom opening of the body 122, a seal 128, a push button 130 and a spring-biased cam 132 operated by the button. The lid 34 fits into the opening 32 of the carafe 20 where the seal 128 engages the surfaces 86, 88 and 90 of the inner rim member 66, which define the opening 32. The lid 34 is locked in this position by rotation of the lid whereby wings (not shown) formed on the side of the body 122 glide under locking ribs (not shown) extending radially inward from the inner rim member 66.

In the position illustrated in FIG. 2, the sealing member 124 is pressing against the underside of the seal 128 to preclude the dispensing of the beverage from the carafe 20. To facilitate the dispensing of the beverage from the carafe, the button 130 is depressed whereby the cam 132 is operated to lower the sealing member 124 away from the seal 128 and to lock the sealing member in the open position. The beverage can now flow through an opening 134 formed in the lid 34 and into the spout 30 for eventual dispensing of the beverage from the carafe 20. The button 130 is again depressed to reseal the lid 34 whereby the cam 132 is released and the button returns to the raised, closed position by action of a spring 136.

Referring to FIGS. 2 and 6, a handle attachment assembly 138 includes a pocket 140 is formed in a side portion of the outer bottle 42 and has a fastening element 142 attached to the pocket, for example, by welding. The pocket 140 is shown in frontal detail in FIG. 8, and the fastening element 142 is shown enlarged in FIG. 7. The pocket 140 is formed with a flat base surface 144 and a surrounding surface 146 which is somewhat conical in shape. The fastening element 142 is formed with a sleeve 148 having a threaded through hole 150 and a flange 152 at a flat end surface 154 thereof. The flat end surface 154 is attached to the base surface 144 of the pocket 138 with the sleeve 148 extending outward from the bottle 42.

The second or lower end 38 of the handle 28 is formed with a small diameter hole 156 and a large diameter hole 158 concentric with the small hole in a counter-sunk fashion. The small hole 156 is formed with a diameter which will fit snugly over the sleeve 148. When assembling the second end 38 of the handle 28 to the bottle 42, a washer 160 may be placed over the sleeve 148 and the handle is manipulated to slide the small opening 156 thereof over the extended sleeve. Another washer 162 may be placed in the large hole 158 and a threaded fastener 164 is threadedly attached to the extended sleeve to secure the handle 28 to the outer bottle 42 and thereby to the container 22. A cap 166, which is composed of the same material as the handle and which conforms, externally to the shape and size of the large hole 158, is inserted into the large hole to effectively plug the hole. The cap 166 is formed with a base surface 168 which is shaped externally to match the curvature of the handle 28 in the area surrounding the large opening 158 to provide an attractive concealment of any portions of the handle attachment assembly 138.

It is noted that the outer surface of the sleeve 148 is in snug engagement with the inner surfaces of the small hole 156 to obtain the maximum interfacing surface area as compared to using a threaded member solely through the small hole. This enhances the lateral support of the bottom or second end 38 of the handle 28 with the container 22.

As shown in FIG. 2, the handle 28 is composed of the same plastic material as the upper body 24, with which it is integrally molded. The handle 28 is formed with an outboard surface 170 which extends from the first end 36 to the second end 38 thereof and which is arched from side to side. The handle 28 is also formed with two flat edge surfaces 172 on opposite sides of the handle which are contiguous with side edges of the outboard surface 170 along opposite sides thereof. The handle 28 is further formed with a pair of spaced inboard surfaces 174 and 176 which arch from side to side, are contiguous with the two flat edge surfaces 172, and are separated generally in the middle of the handle to form a space 178. A rubber-like compliant handle grip 180 is formed generally in an elongated tubular configuration located within the space 178 between the spaced inboard surfaces 174 and 176 and is secured to the handle 28 in the illustrated position. The grip 180 provides tactile comfort for anyone gripping the handle 28.

As shown in FIGS. 9 and 10, the space 178 between the inboard surfaces 174 and 176 is formed with a flat floor surface 182 and spaced, canted, end walls 184 and 186, which are canted at a prescribed angle. An inverted canoe-shaped mound 188 is formed on the floor surface 182 and extends between the end walls 184 and 186. The mound 188 is formed with a flat surfaces 190 which extends between the end walls 184 and 186. Side surfaces 192 and 194 extend away from the flat surface 190 and are rounded toward the floor surface 182. A pair of arcing slots 196 and 198 are formed generally centrally in the side surfaces 192 and 194 on each side of the flat surface 190. As shown in FIG. 11, the mound 188 is formed with longitudinal edges 200 and 202 along the lower perimeters of the side surfaces 192 and 194, respectively, just above the floor surface 182. The mound 188 is undercut along the edges 200 and 202 to form a pair of grooves 204 and 206, respectively, which extend the length of the mound essentially between the end walls 184 and 186. Each of the grooves 204 and 206 have one wall which is flush with the floor surface 182 as shown in FIG. 11.

As shown in FIGS. 10, 13 and 14, the handle cover 180 is formed with a slightly rounded forward wall 208 and two opposite side walls 210 and 212 which join opposite edges of the forward wall 208 and extend in the same general direction therefrom. As shown in FIG. 12, the handle cover 180 further includes spaced walls 214 and 216 which are in the same plane and are turned inward toward each other at generally right angles from the side walls 210 and 212, respectively. The walls 214 and 216 are formed with spaced, facing edges 218 and 220, respectively. As further illustrated in FIG. 12, each of the facing edges 218 and 220 is formed in a curved bow-like pattern from one end of the handle cover 180 to the other end thereof. The curved bow-like pattern of the facing edges 218 and 220 combine to define an opening 222 having a canoe-shaped profile. A pair of spaced bowed ribs 224 and 226 are formed on opposite sides of an internal surface 228 of the handle cover 180 and extend longitudinally within the cover for a short distance on each side of a middle portion thereof. As shown in FIG. 10, the handle cover 180 is formed with canted ends 230 and 232 which are canted at an angle complementary to the canted prescribed angle of the end walls 184 and 186 of the handle 28.

When assembling the handle cover 180 with the handle 28, a bonding agent is placed selectively into the grooves 204 and 206, into the slots 196 and 198, selectively on top of the mound 188, and selectively on the cover, if desired. The handle cover 180 is positioned as shown in FIG. 10 with the opening 222 facing the mound 188. The handle cover 180 and the handle 28 are moved relatively together whereby the mound 188 is moved into the opening 222. Due to the compliancy of the handle cover 180, the cover spreads as the opening 222 thereof is moved over the mound 188. Eventually, the walls 214 and 216 move into the grooves 204 and 206, respectively, and the ribs 224 and 226 move into the slots 196 and 198, respectively. In addition, the canted ends 230 and 232 of the handle cover 180 move into complementary position with the end walls 184 and 186, respectively, of the handle 28. After the bonding agent cures, the handle cover 180 is held firmly with the handle 28. The securance of the handle cover 180 with the handle 28 is further enhanced by the snug fit of the walls 214 and 216 with the grooves 204 and 206, respectively, and the ribs 224 and 226 with the slots 196 and 198, respectively. As described above, the interlocking structure of the handle 28 and the handle cover 180 form a handle assembly which has the feel of a unitary structure with tactile comfort in a selected region.

The carafe 20 as described above provides a sturdy structure in which the upper body 24 is firmly secured with the container 22 by the latching assembly. Further, leakage into the chamber 70 is precluded due to the firm seating of the seal 52, or the seal 52a, through the seal compression assembly. Additionally, the handle 28 is firmly secured to the container 22 by use of the handle attachment assembly 138. Also, the structure of handle 28 and the handle cover 180 form the handle assembly which provides an enhanced degree of firmness in assembly and comfort level in use of the carafe 20.

In general, the above-identified embodiments are not to be construed as limiting the breadth of the present invention. Modifications, and other alternative constructions, will be apparent which are within the spirit and scope of the invention as defined in the appended claims.

What is claimed is:

1. A beverage vessel, which comprises:

a container formed with an opening at one end thereof;

the opening formed by an inner wall surface of the container;

an outer wall surface formed on the container adjacent the opening thereof having a latch receptor formed therein;

a unitary body formed with an inner wall and an outer wall which are integrally joined at upper ends thereof and spaced apart at lower ends thereof to form an opening between the inner and outer walls;

a latch member formed on the outer wall of the body and formed with structure for latching engagement with the latch receptor of the container;

the unitary body being in assembly with the container with the inner wall surface and the outer wall surface of the container being located within the opening formed by, and between, the inner and outer walls of the unitary body; and the inner wall of the unitary body concealing the opening of the container and forming an opening of the beverage vessel.

2. The beverage vessel as set forth in claim 1, which further comprises:

a handle having an upper end and a lower end;

the upper end of the handle being formed integrally with the unitary body; and the lower end of the handle being attached to an exterior surface of the container.

3. The beverage vessel as set forth in claim 1, which further comprises:

the latch receptor of the container comprising a pocket formed of a prescribed shape in the outer wall surface of the container; and the latch member is a rib formed of a shape complementary to the prescribed shape on an inner surface of the outer wall of the unitary body.

4. The beverage vessel as set forth in claim 1, which further comprises:

a spout formed on the unitary body in communication with the opening of the beverage vessel.

5. The beverage vessel as set forth in claim 2, which further comprises:

a pocket formed in the exterior surface of the container whereat the lower end of the handle is attached;

a fastener element secured to the container within the pocket and formed with a threaded hole;

an opening formed in the lower end of the handle of a size which fits over the fastener element; and a fastener located within the fastener element to retain the lower end of the handle with the exterior surface of the container.

6. The beverage vessel as set forth in claim 1, which further comprises:

a handle attached at opposite ends thereof to the exterior of the container and formed with an inboard exterior surface which faces the exterior of the container;

a portion of the inboard exterior surface of the handle selectively formed in a prescribed configuration; and a compliant cover formed with an interior structure in a configuration generally complementary to the prescribed configuration and positioned over the portion of the inboard exterior surface of the handle to provide a compliant handle grip.

7. The beverage vessel as set forth in claim 6, wherein the prescribed configuration of the inboard exterior surface of the handle comprises:

a mound extending outward from the handle toward the container;

at least one groove formed as an undercut at a juncture of the mound and the handle; and at least one groove formed in a side surface of the mound.

8. The beverage vessel as set forth in claim 7, wherein the compliant cover comprises:

an opening formed in the cover shaped in a profile complementary with the profile of the mound;

at least one wall formed with an edge which nests in the at least one groove formed as an undercut at a juncture of the mound and the handle; and at least one rib within the opening of the cover which nests in the at least one groove formed in a side surface of the mound.

9. A beverage vessel, which comprises:

a container;

a handle attached at opposite ends thereof to an exterior of the container and formed with an inboard exterior surface which faces the exterior of the container;

a portion of the inboard exterior surface of the handle selectively formed in a prescribed configuration; and a compliant cover formed with an interior structure in a configuration generally complementary to the prescribed configuration and positioned over the portion of the inboard exterior surface of the handle to provide a compliant handle grip.

10. The beverage vessel as set forth in claim 9, wherein the prescribed configuration of the inboard exterior surface of the handle comprises:

a mound extending outward from the handle toward the container;

at least one groove formed as an undercut at a juncture of the mound and the handle; and at least one groove formed in a side surface of the mound.

11. The beverage vessel as set forth in claim 10, wherein the compliant cover comprises:

an opening formed in the cover shaped in a profile complementary with a profile of the mound;

at least one wall formed with an edge which nests in the at least one groove formed as an undercut at a juncture of the mound and the handle; and at least one rib formed within the opening of the cover which nests in the at least one groove formed in a side surface of the mound.

12. The beverage vessel as set forth in claim 11, which further comprises a bonding agent located between interfacing portions of the inboard exterior surface of the handle and the compliant cover.

* * * * *